May 30, 1933. O. C. K. HUTCHINSON 1,911,998
GLASSWARE FORMING MACHINE
Filed Aug. 19, 1930 5 Sheets-Sheet 1

Inventor
O.C.K. Hutchinson
By J.F. Rule
Attorney

May 30, 1933.  O. C. K. HUTCHINSON  1,911,998
GLASSWARE FORMING MACHINE
Filed Aug. 19, 1930  5 Sheets-Sheet 2

Inventor
Oliver C. K. Hutchinson
By J. F. Rule,
Attorney

May 30, 1933.  O. C. K. HUTCHINSON  1,911,998
GLASSWARE FORMING MACHINE
Filed Aug. 19, 1930   5 Sheets-Sheet 3

May 30, 1933.    O. C. K. HUTCHINSON    1,911,998
GLASSWARE FORMING MACHINE
Filed Aug. 19, 1930    5 Sheets-Sheet 4
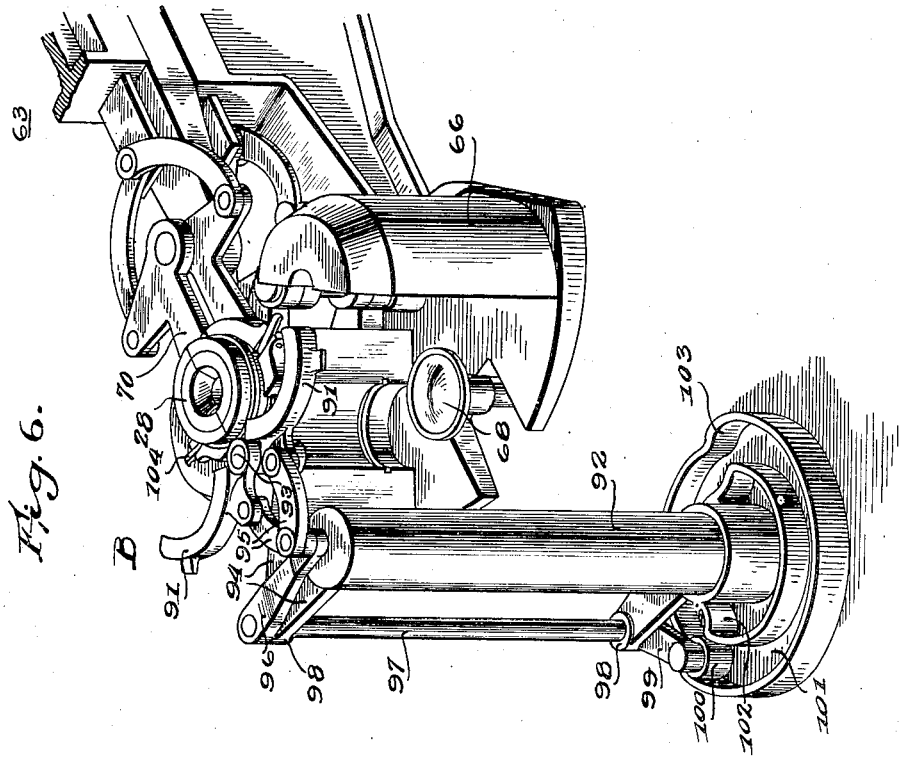
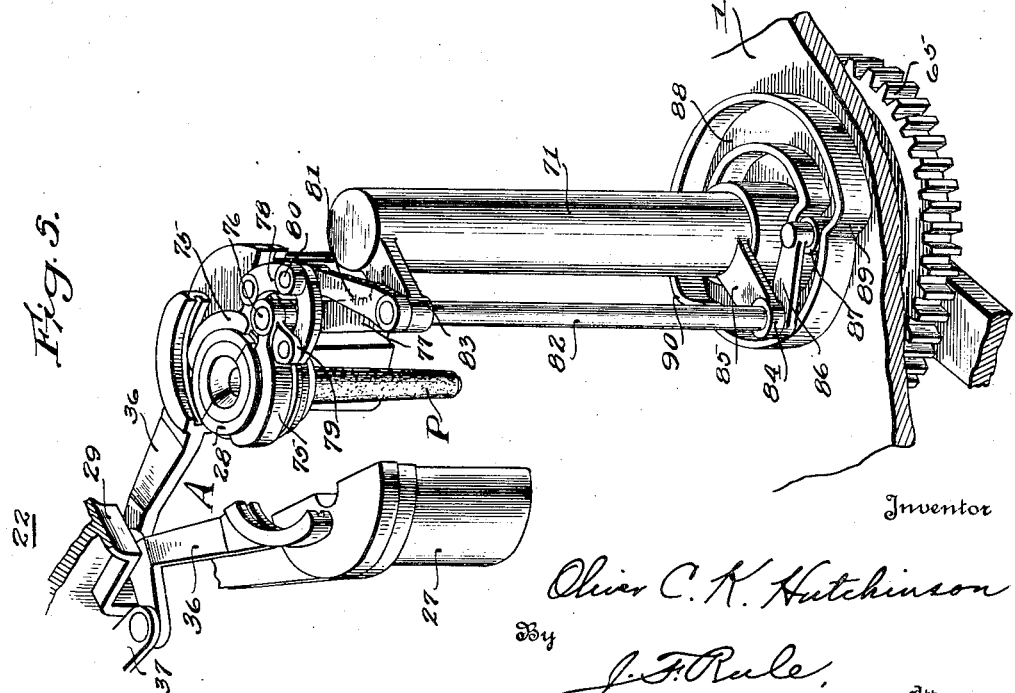
Inventor
Oliver C. K. Hutchinson
By J. F. Rule,
Attorney May 30, 1933. O. C. K. HUTCHINSON 1,911,998
GLASSWARE FORMING MACHINE
Filed Aug. 19, 1930 5 Sheets-Sheet 5
Fig. 7.
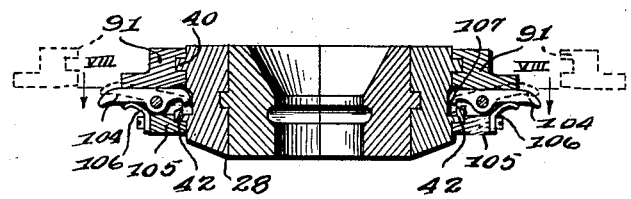
Fig. 8.
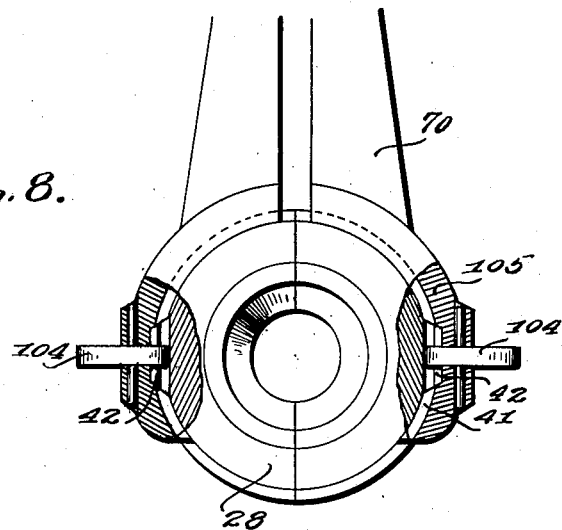
Fig. 9.
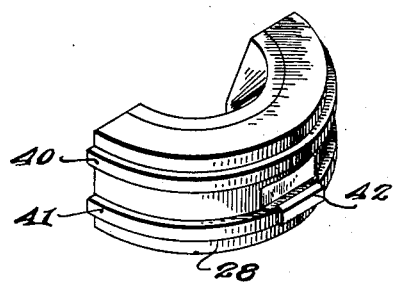
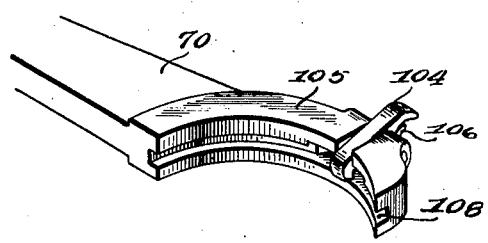
Fig. 10.
Inventor
Oliver C. K. Hutchinson
By J. F. Rule
Attorney Patented May 30, 1933

1,911,998

UNITED STATES PATENT OFFICE

OLIVER C. K. HUTCHINSON, OF ALTON, ILLINOIS, ASSIGNOR TO OWENS-ILLINOIS GLASS COMPANY, A CORPORATION OF OHIO

GLASSWARE FORMING MACHINE

Application filed August 19, 1930. Serial No. 476,311.

The present invention relates to improvements in machines for forming hollow articles of glassware and more particularly to that type of machine in which the articles are partially formed in blank molds on one table and completed in finishing molds on another table.

In machines of the above character blank and finishing mold tables are arranged side by side and rotated in synchronism about separate vertical axes so that blank molds are carried in succession to a mold charging station and then to a blank transfer station where the blanks are removed from the blank molds and placed in finishing molds preparatory to completing the articles of glassware being produced. Each blank mold group includes partible cooperating blank and neck molds both of which are ordinarily removed from contact with the glass at or in advance of the blank transfer station. If it so happens that the articles of glassware being produced involve comparatively heavy finishes and/or neck portions, it is very desirable to maintain intimate contact between said finish and neck portions and the neck mold so that the latter extracts sufficient heat from said portions to prevent collapse and distortion thereof at or beyond the blank transfer station. Frequently due to the quantity of glass in the finish and neck portions of the blank sufficient heat cannot be extracted by the neck molds because of the relatively short period of contact between the glass and neck molds, said period of contact ordinarily approximating the time required for the mold carriage to rotate through 90 to 100 degrees.

An object of the present invention is the provision of novel means by which transfer of blanks or parisons from the blank molds to the finishing molds likewise involves transfer of the associated neck molds to the finishing mold table and resultant continued contact between the glass and neck molds. Thus, complete and perfect setting of the glass in the neck and finish portions is assured. Accordingly, screw threaded necks and finishes for crown seal caps, etc. may be very accurately formed with the result that perfect sealing of the containers may be obtained.

Another object is the provision of novel blank transfer means positioned in its entirety between the blank and finishing mold tables, thereby providing for compactness and simplicity in design.

Other objects will be in part apparent and in part pointed out hereinafter.

In the accompanying drawings:

Fig. 5 is a detail perspective view of the transfer mechanism by which blanks and neck molds are removed from the blank mold table and placed in operative relation to molds on the finishing mold table.

Fig. 6 is a view similar to Fig. 5 showing the mechanism for returning the neck molds to the blank mold table.

Fig. 7 is a detail sectional view illustrating the automatically releasable connection between neck mold arms on the finishing mold table and the neck molds.

Fig. 8 is a sectional plan view of the parts shown in Fig. 7 taken along the line VIII—VIII of Fig. 7.

Fig. 9 is a detail perspective view of a neck mold section.

Fig. 10 is a detail perspective view of one of the neck mold arms on the finishing mold table showing the releasable latch for connecting the arm and a neck mold section.

Figure 1:
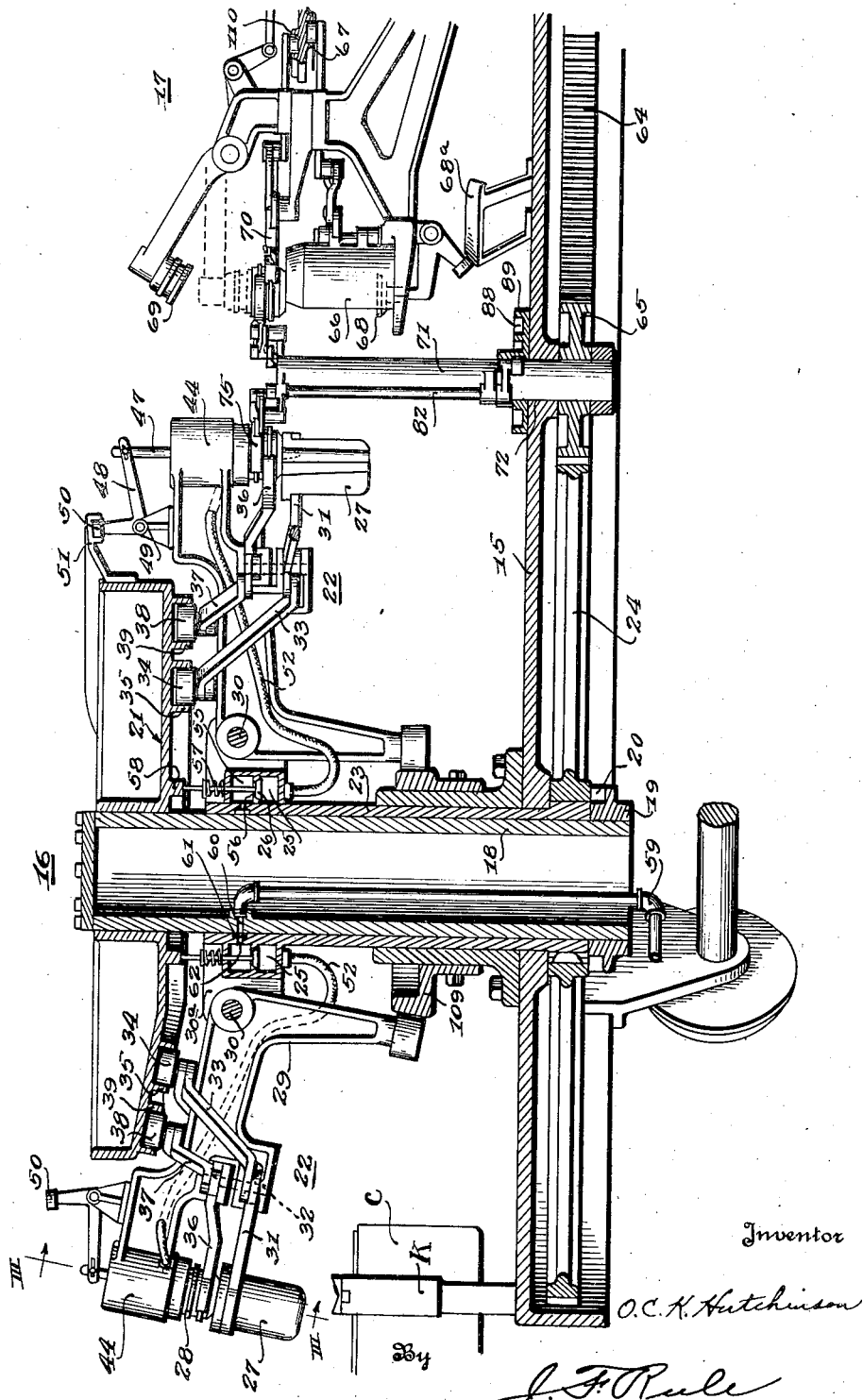
Fig. 1 is a vertical sectional elevation showing a blank mold table and a portion of a finishing mold table between which tables is arranged my improved blank and neck mold transfer mechanism.

In more or less general terms the machine comprises a pair of rotary blank and finishing mold tables arranged side by side and rotating continuously about spaced vertical axes. The blank mold table supports an annular series of mold groups which are brought in succession to a mold charging station where measured quantities of glass are obtained from a supply body. As the mold groups arrive at the mold charging station they are lowered placing their open ends in contact with a supply body of molten glass. While so positioned vacuum is applied to the blank mold cavities as well as the cavities of neck molds associated therewith so that charges of molten glass are drawn into said molds. The gathered mold charges assume the shapes of the blank and neck mold cavities and are thereby transformed into blanks or parisons. Upon reaching a blank transfer station the blank molds open and the neck molds, while supporting the blanks or parisons, are transferred from positions in register with the blank molds to corresponding positions in register with finishing molds on the finishing mold table. The finishing molds close about the parisons and said parisons are then expanded to their final shapes and later ejected from said molds. Just before the finishing molds reach the blank and neck mold transfer station, the neck molds which have been cooperating with the finishing molds in final expansion of the articles of glassware and in holding the neck and finish portions against collapse and distortion, are removed from the finishing mold table and returned to the blank mold table, such return placing the neck molds in register with the blank molds preparatory to gathering additional mold charges of glass.

More specifically the machine comprises a horizontally disposed wheeled base 15 upon which the blank and finishing mold tables 16 and 17 are mounted, said tables adapted to rotate continuously in the same direction about spaced vertical axes so that their adjacent sides in proximity to the blank and neck mold transfer station, will move substantially in opposite direction.

The blank mold table comprises an annular series of mold groups 22 each including a partible section body blank mold 27 and partible neck mold 28 associated therewith, said mold groups adapted to be raised and lowered at regular time intervals for the purpose of placing the molds at the elevations necessary to gather mold charges and transfer blanks or parisons and neck molds to the finishing mold table 17. A comparatively simple embodiment of the above is illustrated in the accompanying drawings wherein the blank mold table includes a stationary central column 18 extending upwardly through the base 15, said column connected at its lower end to a collar 19 or supporting ring, having arms 20 through which the latter is suitably connected to the base 15. This column 18 extends a considerable distance above the base 15 and at its upper end supports a cam plate 21 which carries cams for controlling opening and closing of the blank and neck molds, actuation of a plunger and opening of vacuum control valves, all of which will be more particularly pointed out hereinafter. A rotary carrier for the blank mold groups 22 (Fig. 1) is mounted on the central column 18 and comprises a sleeve 23 surrounding a major portion of the central column 18, said sleeve extending below the base 15 and suitably connected to a driving gear 24 to which rotary motion may be imparted by any suitable means (not shown). At the upper end of the sleeve 23 there is provided an annular series of vacuum chambers 25 and valves 26 therefor, said chambers and valves corresponding in number to that of the mold groups and adapted to rotate with the latter.

Each blank mold group 22 comprises cooperating partible body blank and neck molds 27 and 28 respectively, carried by a dipping frame, including a bell crank lever 29 which provides for up and down movement of said molds, said bell crank lever for this purpose being pivoted to a horizontal hinge pin 30 mounted in spaced arms 30ª carried at the upper end of the sleeve 23. The body blank mold 27 is composed of two sections supported on a pair of mold arms 31 pivoted to a vertical hinge pin 32, said arms connected through links 33 to a cam roll 34 running in a stationary cam 35 provided on the lower side of the cam plate 21 and shaped to alternately open and close the body blank mold 27 at regular time intervals and in synchronism with other operations.

Each neck mold 28 (Figs. 1, 7, 8, and 9) comprises two sections supported on the neck mold arms 36 which extend radially inward and are pivoted to the vertical hinge pin 32, said arms also being connected to links 37 carrying a cam roll 38 which runs in a stationary cam 39 on the lower side of the cam plate 21. The cam 39 is of such shape that operating through the cam roll 38 and links 37 it opens the neck mold arms 36 so that the neck mold 28 and a blank or parison suspended therefrom, may be removed from the blank mold table 16 by suitable transfer mechanism, to be described presently, and placed on the finishing mold table 17. Each neck mold section is provided with upper and lower ribs 40 and 41 respectively, adapted for engagement one at a time with transfer mechanisms hereinafter set forth. A lug 42 substantially midway the length of the lower rib 41 provides part of the separable connection between the neck mold sections and neck mold arms on the finishing mold table as will be set forth hereinafter.

Figure 3:
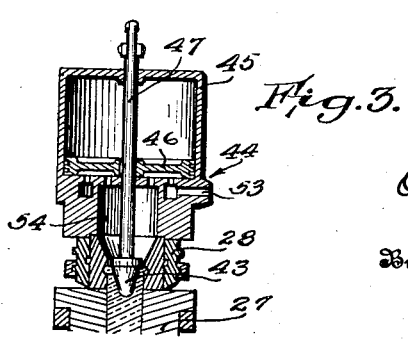
Fig. 3 is a sectional view taken substantially along the line III—III of Fig. 1.

Plunger mechanism (Figs. 1 and 3) individual to the blank mold groups 22 comprises a plunger 43 arranged for reciprocation into and out of the neck mold 28 in assisting in the formation of blanks or parisons. Such movement of the plunger is obtained by an air motor 44 which is provided at the outer end of the corresponding bell crank lever 29. Each motor (Fig. 3) includes a vertical cylinder 45 enclosing a piston 46 which in turn is secured to a piston rod 47. The plunger 43 is attached to the lower end of the piston rod 47 so that with the reciprocation of the latter, corresponding movement is imparted to the plunger. Projection of the plunger into the neck mold (Fig. 3) is effected simultaneously with, and by application of vacuum to the neck and blank mold cavities. Retraction of the plunger 43 is obtained by a bell crank lever 48 pivoted to a bracket 49 on the corresponding arm 29 and carrying a cam roll 50 which at regular time intervals engages a stationary cam 51 (Fig. 1) so located and shaped that it rocks said lever 48 and lifts the plunger just prior to transfer of the blanks and neck molds to the finishing mold table at station A.

Application of vacuum to the blank and neck mold cavities and to the lower ends of the piston motors 45 for the purpose of gathering mold charges into said cavities, and projecting the plunger 43 into the neck molds respectively, is obtained by a construction involving the vacuum chambers 25 and valves 26 (Fig. 1) which, as heretofore stated, are individual to the blank mold groups 22. The vacuum chambers 25 at the upper end of the rotary sleeve 23 (Fig. 1) are connected through flexible pipes 52 to ports 53 in the lower ends of the motor cylinders 45. These ports 53 communicate with the blank and neck mold cavities by way of the lower ends of the motor cylinders and vertical openings 54 in register with the neck mold cavities. The vacuum chambers 25 at regular time intervals communicate with chambers 55 (Fig. 1) by way of the valved openings 56 which are normally closed by the valves 26. A coil spring 57 encircling each valve stem above the chamber 55 yieldingly holds the valve 26 closed while a stationary cam 58 carried by the cam plate 21, periodically opens said valve. Vacuum is constantly applied to the upper chambers 55 by way of a supply pipe 59 extending upwardly into the stationary column 18 and communicating through the opening 60 in said column with an annular groove 61 or channel, formed on the inner face of the rotary sleeve 23, said groove in turn communicating with the vacuum chambers 55 by way of ports 62.

The finishing mold table 17 comprises an annular series of mold groups 63 (Figs. 1 and 2) rotatable continuously about a vertical axis in the same direction as the blank mold table 16. Such rotary movement of the finishing mold table is obtained by a gear 64 connected to the mold carriage in any suitable manner (not shown) and operatively connected to the gear 24 through a pair of gears 65 which operate the blank and neck mold transfer mechanisms. Each finishing mold group may include a partible finishing mold 66 adapted to be alternately opened and closed by any conventional or preferred form of mechanism including a stationary cam 67. A vertically movable bottom plate 68 cooperates with the finishing mold 66 in finally shaping the articles of glassware, while a blowing head 69 having suitable connections with a source of blowing air supply (not shown) is arranged individual to the mold group for expanding parisons "P" or blanks to their final shapes. Neck mold arms 70 (Figs. 1 and 6) are included in each finishing mold group and cooperate with the blank and neck mold transfer mechanisms as will be described presently. A cam 110 operates through suitable mechanism to alternately open and close the arms 70.

Upon completion of a blank or parison, and just prior to arrival of the blank mold group at the blank and neck mold transfer station A (Figs. 2, 4, and 5) the cam 35 (Fig. 1) operates the mechanism described heretofore to open the blank mold 27, thereby leaving the bare blank suspended from the neck mold. Immediately the blank and neck mold transfer mechanism grips the neck mold 28 and upon release of said mold from the arms 36 carries said neck mold 28 and blank suspended therefrom, to a position in which the neck mold is above and in register with the bottom plate 68 preparatory to closing of the finishing mold 66 about the blank. The transfer mechanism whereby the above operation is carried out comprises a vertical rotary column 71 (Figs. 1, 2, 4 and 5) supported in a bearing 72 provided in the base 15, at one side of a center line extending through the axes of the blank and finishing mold tables 16 and 17. This column 71 is secured to one of the gears 65 so that rotation of the latter rotates said column in synchronism with movement of the two tables.

A gripping device comprising in the present disclosure, a pair of tongs 75, is carried by, and at the upper end of the rotary column 71, said tongs adapted to rotate continuously about the axis of the column 71 and in synchronism with movement of the molds, so that they first engage the upper ribs 40 on the neck molds to thereby effect positive connection between said tongs and neck molds. Rotary movement of the column 71 and tongs 75 then carries the latter to a position over one of the finishing molds 66. The finishing mold immediately closes about the parison "P" and the tongs 75 then release the neck mold to the holding influence of the neck mold arms 70 which are individual to the finishing mold groups 63. These tongs 75 comprise a pair of arcuate arms provided on their inner face with grooves (not shown) extending lengthwise in the fashion illustrated in connection with the neck mold arms 36 (Fig. 5) said grooves adapted to receive the upper ribs 40 on the neck mold sections. These tongs are pivoted to a vertical hinge pin 76 (Figs. 4 and 5) rising from a horizontally disposed arm 77 carried by the rotary column 71 and are adapted to be alternately opened and closed by mechanism including a pair of links 78 connected at one end to ears 79 and at their other end to a vertical hinge pin 80 which secures said links to a rock arm 81 at the upper end of a rock shaft 82. This rock shaft 82 (Fig. 5) extends vertically, and parallel with the rotary column 71, and is journaled at its upper end in a bearing 83 formed in the arm 77 and at its lower end in a bearing 84 carried by an arm 85 formed on the rotary column. A rock arm 86 is secured to the lower end of the rock shaft 82 and carries a cam roll 87 running in a continuous stationary cam 88, the latter encircling the column 71 and suitably supported on the base 15. This cam is formed with an angular portion 89 which rocks the shaft 82 when the tongs are to be brought into holding engagement with a neck mold 28 preparatory to transferring the neck mold and a blank or parison "P" suspended therefrom, to the finishing mold table. The angular portion 90 (Figs. 2, 4, and 5) is reached by the cam roll 87 just after the neck mold arms 70 on the finishing mold group 63 engage the neck mold 28 so that the tongs 75 are thereby separated and release the neck mold to the holding influence of said arms 70. Thus the blanks together with neck molds supporting them are transferred to the finishing molds.

Figure 2:
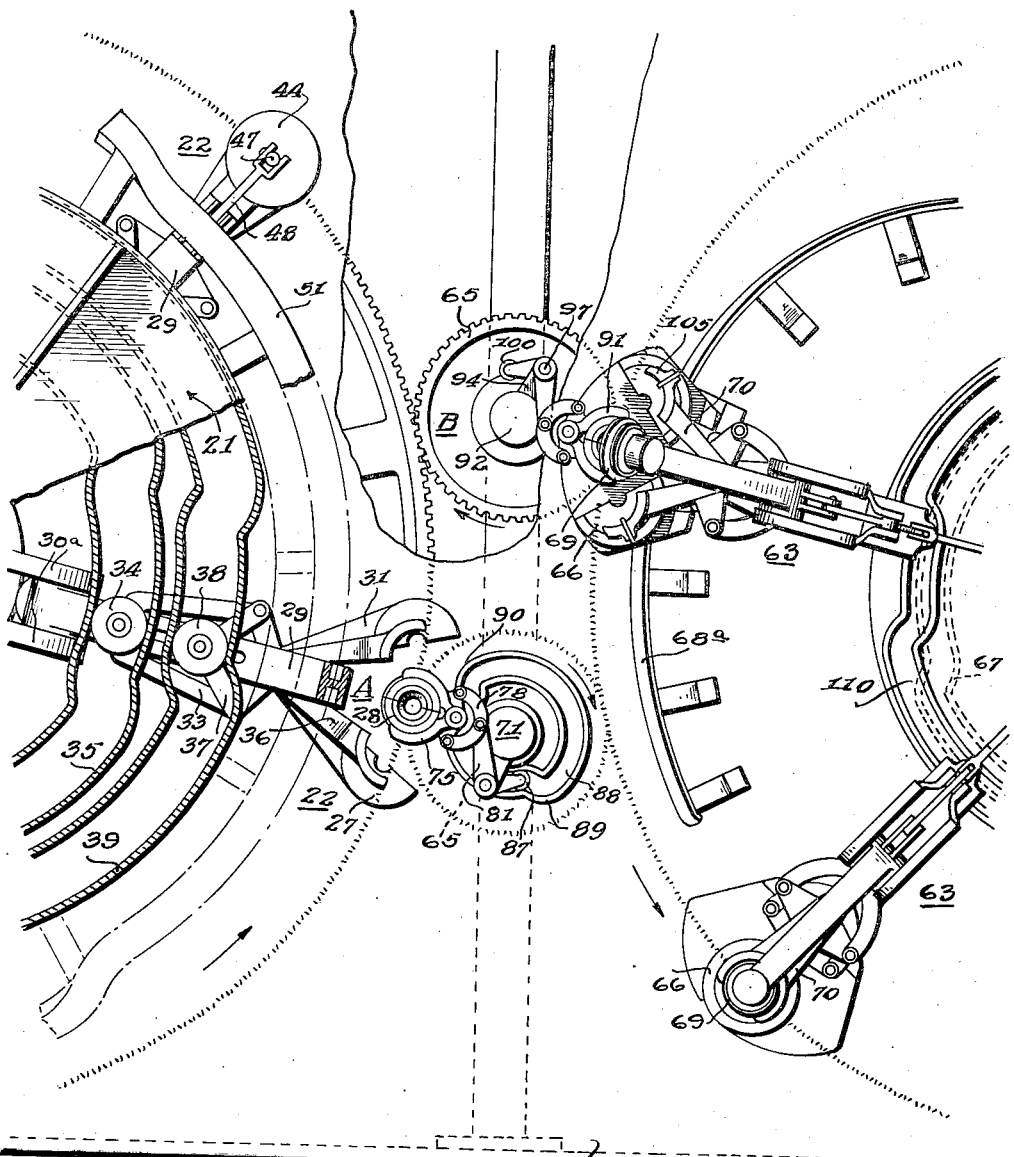
Fig. 2 is a fragmentary sectional plan view thereof.
Figure 4:
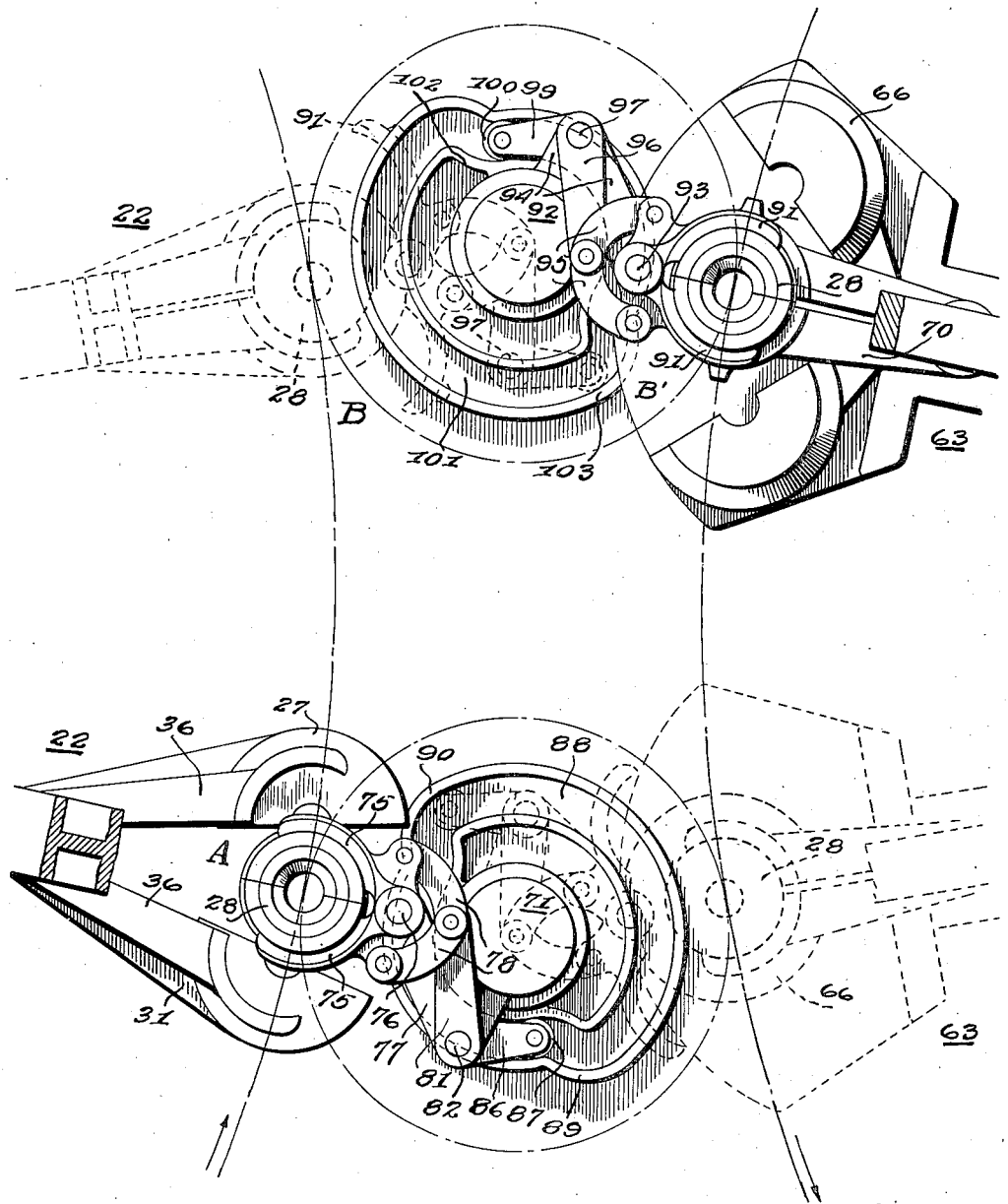
Fig. 4 is a detail plan view of the transfer mechanisms.

After the blanks or parisons have been finally expanded, the neck and finishing molds 28 and 66 respectively, are opened and the bottom plate 68 tilted by the cam 68ª to thereby discharge the finished article. This operation is followed by closing of the neck mold 28 prior to arrival at a neck mold transfer station B (Figs. 2, 4, and 6). At this station transfer mechanism (Fig. 6) operating in substantially the same manner as the mechanism shown in Fig. 5 and described above, removes the neck molds 28 from the finishing mold table and returns them to the mold groups on the blank mold table 16. Each such mechanism includes a pair of tongs 91 mounted upon the upper end of a rotary column 92 whose lower end is journaled in a bearing (not shown) in the base 15 and is suitably connected to one of the gears 65. These tongs 91 are pivoted to a vertical hinge pin 93 at the outer end of an arm 94 carried by the column 92 and are adapted to be alternately opened and closed by means including a pair of links 95 which provide connection between said tongs and a rock arm 96 secured to one end of a rock shaft 97. The rock shaft is journaled in vertically spaced bearings 98 and extends parallel with the column 92, there being secured to the lower end of said rock shaft, a rock arm 99 which in turn carries a cam roll 100 running in a stationary continuous cam 101, the latter encircling the lower end of the column and supported on the base 15. In this cam 101 an angular portion 102 is formed to rock the shaft 97 and close the tongs 91, while the angular portion 103 rocks the shaft in a reverse direction to open the tongs to release the neck molds to the holding influence of the neck mold arm 36.

In order that the neck mold sections 28, while carried by the finishing mold table, may open after the final blowing operation without dropping out of the neck mold arms 70, an automatically actuated latch mechanism is provided. This mechanism comprises a pivoted latch 104 or locking finger carried by the arcuate extension 105 of each neck mold arm 70 (Figs. 6, 7, 8, and 10), said latch being yieldingly held in its operative position by a spring 106. The inner end of each latch 107 is tapered so that when the arms are brought together about a neck mold said latch will ride up over the inclined upper end of the lug 42 and snap into locking engagement with the latter. This locking mechanism, together with projection of the lower ribs 41 into the grooves or channels 108 (Fig. 10), insures against accidental separation of the neck mold sections and arms 70. While the latch 104 is in locking engagement with one of the lugs 42 its outer end extends upwardly at an angle as shown in dotted lines in Fig. 7 and in full lines in Fig. 10. Accordingly, when the tongs 91 are brought into holding engagement with a neck mold they slidingly contact the upper sides of the latches and rock them to the full line positions shown in Fig. 7 so that the neck mold arms 70 on the finishing mold group may be moved outwardly (Fig. 2) and thereby allow the tongs 91 to grip and transfer the empty neck mold 28 to the blank mold table 16.

In operation, both the blank and finishing mold tables are rotated continuously and in synchronism with one another as well as with the transfer mechanisms disposed between said tables. By such rotation the blank mold groups are brought in succession to a charge gathering position over a container "C" for molten glass and due to the shape of the cam 109 (Fig. 1) the bell crank levers 29 are rocked to thereby lower the blank molds 27 into charge gathering contact with the glass in said container. Vacuum is applied to the mold cavities and thereby fills said cavities with molten glass, the glass in the mold being severed from the supply body by a cut-off knife "K", common to the series of blank mold groups. The blanks or parisons are completely formed in the blank and neck molds 27 and 28 prior to reaching station "A" (Figs. 2, 4, and 5). The blank molds 27 are opened prior to reaching said station, thereby leaving bare blanks suspended from the neck molds. While the blank mold groups move past the transfer station "A", the tongs 75 on the transfer mechanism are brought together about the upper portions of the neck molds into engagement with the upper ribs 40. Holding engagement between said tongs 75 and the neck molds 28 is immediately followed by separation of the neck mold arms 36 (Figs. 1 and 5), permitting the transfer mechanism to completely remove the neck molds 28 and blanks "P" or parisons suspended therefrom, from the blank mold table 16 preparatory to placing said neck molds and blanks upon the finishing mold table 17. Rotation of the transfer mechanism carries the neck molds and parisons to positions over and in register with the finishing mold bottom plates 68 (Figs. 1, 4, and 6). Immediately, the neck mold arms 70 are closed about the lower portions of the neck molds in engagement with the ribs 41, by means of mechanism which is actuated by a stationary cam 110 on the finishing mold table. Simultaneously with closing of the neck mold arms 70 the corresponding finishing molds 66 are closed and the tongs 75 are opened so that the neck molds may be completely released to the holding influence of the neck mold arms 70 and finishing molds 66. Final expansion of the blanks or parisons in the finishing molds may be obtained in any desired manner, as by means of blowing air applied through the blowing heads 69, such operation being followed by opening of the neck and finishing molds, and tilting of the bottom plates 68. Thus, the finished articles are discharged. The neck molds 28 are then closed by the arms 70 preparatory to their being returned to the blank mold table. Such return of the neck molds to the blank mold table 16 takes place at station "B" (Figs. 2, 4, and 6) where the tongs 91 are brought together about the neck molds, thereby releasing said molds from the latches 104 as described above, and themselves engaging the upper ribs 40. The neck mold arms 70 are immediately opened and the tongs 91 carry the neck molds 28 back to the black mold table 16 where they are again securely gripped by the neck mold arms 36. This constitutes the cycle of operations involved in operating my machine.

Modifications may be resorted to within the spirt and scope of the appended claims.

What I claim is:

1. A glassware forming machine comprising blank and finishing mold tables arranged side by side and rotatable about spaced vertical axes, means for rotating the tables, partible blank and neck molds on the blank mold table, partible finishing molds on the finishing mold table, means for forming blanks in the blank and neck molds, and two transfer devices arranged between said tables and rotating about separate vertical axes, one of said devices operating automatically to transfer neck molds together with blanks suspended therefrom to the finishing mold table, and the other device operating automatically to return the neck molds alone to the blank mold table.

2. A glassware forming machine comprising blank and finishing mold tables arranged side by side and rotatable about spaced vertical axes, means for rotating the tables, partible blank and neck molds on the blank mold table, partible finishing molds on the finishing mold table, means for forming blanks in the blank and neck molds, two transfer devices arranged between said tables and rotating about individual vertical axes, one of said devices operating automatically to transfer neck molds together with blanks suspended therefrom to the finishing mold table, the other device operating automatically to return the neck molds alone to the blank mold table, said devices including pivoted tongs, and means to actuate the tongs so that they alternately grip and release the neck molds.

3. In a glassware forming machine the combination of blank and finishing mold tables arranged side by side and rotatable about spaced vertical axes, means for continuously rotating the tables in the same direction whereby adjacent sides of the tables move in opposite directions, mechanisms arranged between the tables and operated by rotation of the latter for transferring the neck molds together with blanks suspended therefrom to the finishing mold table and later returning the neck molds alone to the blank mold table, each of said mechanisms comprising a pair of neck mold gripping devices, said gripping devices rotating about spaced vertical axes in synchronism with movement of the mold tables, and means for actuating said devices whereby they alternately grip and release the neck molds.

4. In a glassware forming machine the combination of blank and finishing mold tables arranged side by side and rotatable about spaced vertical axes, means for continuously rotating the tables in the same direction whereby adjacent sides of the tables move in opposite directions, mechanisms arranged between the tables and operated by rotation of the latter for transferring the neck molds together with blanks suspended therefrom to the finishing mold table and later returning the neck molds alone to the blank mold table, each of said mechanisms comprising a pair of neck mold gripping devices, said gripping devices rotating about spaced vertical axes in synchronism with movement of the mold tables, and cam mechanism operated by rotation of said devices for causing the latter to alternately grip and release the neck molds.

5. In a glassware forming machine the combination of blank and finishing mold tables arranged side by side and rotatable about spaced vertical axes, means for rotating the tables, partible blank and neck molds on the blank mold table, neck mold supporting arms individual to the molds on said blank mold table, said arms being mounted on the blank mold table for rotation therewith and supporting the neck molds independently of the blank molds, partible finishing molds on the finishing mold table, neck mold supporting arms individual to the molds on said finishing mold table, said last named arms being mounted on the finishing mold table for rotation therewith and supporting the neck molds independently of the finishing molds, releasable locking devices for locking the neck molds and arms on the finishing mold table, whereby movement of the arms imparts corresponding movement to the neck mold sections supported thereon, mechanism for removing neck molds together with blanks suspended therefrom from the blank mold table and transferring them to the finishing mold table, and mechanism operating automatically to release the neck molds from the holding influence of the locking devices and return said neck molds to the blank mold table.

6. In a glassware forming machine, the combination of blank mold and finishing mold tables arranged side by side and rotatable about spaced vertical axes, means for continuously rotating said tables, partible neck and blank molds on the blank mold table, partible finishing molds on the finishing mold table, pairs of pivoted neck mold supporting arms mounted on said tables respectively for continuous rotation with said tables, said pairs of arms being individual to the blank and finishing molds respectively and supporting the neck molds independently of the blank molds and finishing molds, means for forming blanks in the blank and neck molds, means for transferring the neck molds together with blanks suspended therefrom to the finishing mold table, and means for later returning the neck molds alone to the blank mold table.

7. In a glassware forming machine, the combination of blank mold and finishing mold tables arranged side by side and rotatable about spaced vertical axes, means for continuously rotating said tables, partible neck and blank molds on the blank mold table, partible finishing molds on the finishing mold table, neck mold supporting arms mounted on said tables respectively for continuous rotation therewith, said arms being individual to the blank and finishing molds and supporting the neck molds independently of the blank and finishing molds, means for forming blanks in the blank and neck molds, means for transferring the neck molds together with blanks suspended therefrom to the finishing mold table, means for alternately opening and closing said neck mold supporting arms, locking devices providing separable connection between the neck mold arms on the finishing mold table and the neck mold sections, and neck mold transfer mechanism operable to release neck molds from the locking device and return them to the blank mold table.

8. In a glassware forming machine the combination of blank and finishing mold tables arranged side by side and rotatable about spaced vertical axes, means for rotating said tables, partible neck and blank molds on the blank mold table, partible finishing molds on the finishing mold table, a neck mold carrier associated with each blank mold and comprising a pair of separable arms for gripping a neck mold, neck mold carriers individual to the finishing molds and comprising a pair of separable arms, locking devices carried by the last named carriers and adapted to provide separable connection between neck molds and said carriers whereby actuation of the arms alternately opens and closes the neck molds, mechanisms arranged between the tables for transferring neck molds together with blanks suspended therefrom, from the blank mold table to the finishing mold table and then returning the neck molds alone to the blank mold table, and means whereby the locking devices are automatically actuated to release the neck molds to the influence of the transfer mechanisms just prior to return of said neck molds to the blank mold table.

9. In a glassware forming machine the combination of an annular series of partible blank and neck molds, an annular series of partible finishing molds arranged at one side of said blank and neck molds, means for continuously rotating the two series of molds about separate vertical axes and in the same direction whereby the molds of one series move in the opposite direction from those of the other series at a pair of transfer stations between said series of molds, means arranged at one of said stations to transfer the neck molds together with blanks suspended therefrom into operative relation to the finishing molds, and means at the other station to return the neck molds alone to operative positions relative to the blank molds, said transfer means rotating about vertical axes individual thereto.

10. In a glassware forming machine, the combination of blank mold and finishing mold tables arranged side by side and rotatable in the same direction about separate vertical axes, means for rotating the tables, partible blank and neck molds on the blank mold table, partible finishing molds on the finishing mold table, neck mold carriers, individual to the blank and finishing molds, adjacent sides of the tables moving past a pair of transfer stations, mechanism arranged at one station to transfer neck molds together with blanks suspended therefrom to the finishing mold table, mechanism at the other station to return the neck molds alone to the blank mold table each of said mechanisms including tongs rotating continuously about a vertical axis individual thereto, and cam means operated by rotation of the tables to alternately open and close the tongs to thereby grip and release the neck molds in alternation.

11. In a glassware forming machine a partible finishing mold, a partible neck mold, a neck mold carrier comprising a pair of arms having portions adapted to grip a neck mold, locking devices for separably connecting the neck mold sections and said arms whereby movement of the latter correspondingly moves the neck mold, and mechanism for automatically releasing neck molds from the holding influence of said locking devices and removing them from said arms.

12. In a glassware forming machine an annular series of partible blank and neck molds rotatable about a vertical axis, an annular series of partible finishing molds rotatable about a vertical axis spaced from the blank and neck molds, means for continuously rotating both series of molds in the same direction whereby adjacent portions move in opposite directions past a pair of transfer stations, means for transferring neck molds together with blanks suspended therefrom to operative positions relative to the finishing molds at one station, means for transferring neck molds from operative positions relative to the finishing molds to corresponding positions relative to the blank molds at another station, said transfer means each comprising tongs rotating continuously about individual vertical axes and adapted to alternately grip and release the neck molds, and means actuated by rotation of said molds for alternately opening and closing the tongs.

13. In a machine for forming glass articles, the combination of a blank mold carriage, blank molds and neck molds thereon, a finishing mold carriage, finishing molds thereon, said carriages spaced apart laterally, means for rotating said carriages about vertical axes, a transfer mechanism interposed between the mold carriages, said mechanism including a gripping device and means for rotating it continuously about an axis parallel with the axes of the mold carriages, automatic means for causing said gripping device to engage a neck mold while the latter is supported on the blank mold carriage and transfer said neck mold with a parison supported therein to the finishing mold carriage, means for enclosing the parison in a finishing mold, and means for returning said neck mold to the blank mold carriage.

14. In a machine for forming glass articles, the combination of a blank mold carriage, blank molds and neck molds thereon, a finishing mold carriage, finishing molds thereon, said carriages spaced apart laterally, means for rotating said carriages about vertical axes, a transfer mechanism interposed between the mold carriages, said mechanism including a gripping device and means for rotating it continuously about an axis parallel with the axes of the mold carriages, automatic means for causing said gripping device to engage a neck mold while the latter is supported on the blank mold carriage and transfer said neck mold with a parison supported therein to the finishing mold carriage, means for enclosing the parison in a finishing mold, and a second transfer mechanism separate from said first mentioned transfer mechanism operable to return said neck mold from the finishing mold carriage to the blank mold carriage.

15. A glassware forming machine comprising blank and finishing mold tables arranged side by side and rotatable about spaced vertical axes, means for rotating the tables, partible blank and neck molds on the blank mold table, partible finishing molds on the finishing mold table, two transfer devices arranged between said tables and rotating about separate vertical axes, one of said devices operating automatically to transfer neck molds together with blanks suspended therefrom to the finishing mold table, and the other device operating automatically to return the neck molds alone to the blank mold table, each device including a rotary vertical shaft, a pair of pivoted tongs at the upper end of the shaft, a stationary continuous cam encircling the lower end of said shaft, means for continuously rotating the shaft and tongs, and means through which the cam operates to alternately open and close the tongs during rotation thereof.

Signed at Alton, Illinois, this 31st day of July, 1930.

OLIVER C. K. HUTCHINSON.